United States Patent [19]
Pritchard

[11] Patent Number: 5,722,808
[45] Date of Patent: Mar. 3, 1998

[54] THREADED FASTENER SYSTEM

[75] Inventor: Alan Pritchard, Walchwil, Switzerland

[73] Assignee: Conti Fasteners AG, Baar, Switzerland

[21] Appl. No.: 710,126

[22] Filed: Sep. 11, 1996

[51] Int. Cl.$^6$ .............................. F16B 35/00; F16B 35/04
[52] U.S. Cl. .................... 411/366; 411/411; 411/414; 411/423
[58] Field of Search ........................ 411/366, 386, 411/387, 393, 411, 414, 416, 423

[56] References Cited

U.S. PATENT DOCUMENTS

| | | | |
|---|---|---|---|
| 1,876,796 | 9/1932 | Trbojevich | 411/423 |
| 2,514,589 | 7/1950 | Penman | 411/423 |
| 3,394,626 | 7/1968 | Oliver | 411/411 |

*Primary Examiner*—Neill R. Wilson
*Attorney, Agent, or Firm*—Cesari and McKenna, LLP

[57] ABSTRACT

A fastener system capable of clamping a workpiece that provides for enhanced distribution of the internal forces that are generated in the components as a result of the assembly of the system. The fastener system includes an externally threaded member having a thread formed thereon with a substantially non-triangular profile, and an internally threaded member having a thread formed therein which also includes a substantially non-triangular profile. In assembled form, the substantially non-triangular thread faces of the internally and externally threaded members mate along a contact face and, by virtue of their unique thread forms, are able to withstand axial loads of greater magnitude than comparable systems employing threads having substantially triangular profiles.

10 Claims, 3 Drawing Sheets

THREADED FASTENER SYSTEM

BACKGROUND OF THE INVENTION

1) Field of the Invention

This application is directed toward a novel concept in the construction of an external and internal mating thread device that provides for enhanced distribution of the internal forces that are generated in the components that contain the external and internal threads.

More specifically, the internal forces to which this invention relates are generated as a result of applied axial tension, for example, developed by contact face clamping forces in a structure that contains two or more separate parts that are joined together using threaded fastener technology. Such internal forces, however, can also be developed as a result of axial compression.

The system that is the subject of the novel and inventive nature of the mating external and internal thread device is particularly suited to, but not restricted by, a system that generates the internal thread, using material displacement technology, by inserting the external threaded fastener into a plain bore pilot hole and applying counter rotation between the externally thread ed component and that which contains the plain bore hole into which the internal thread is to be formed. Such nominal axial force being in the direction that the external fastener will move relevant to the plain bore pilot hole into which the internal thread will be generated.

2) State of the Prior Art

Generally speaking, the objective of having an external and internal threaded fastener device is to use the helical thread form to generate a tensile load during the counter rotation of the threaded external and internal elements that can be transmitted into a force that can be utilized in clamping two or more component parts together, to form a structure.

Such external and internal fastener systems that are of existing known proportions follow the standardization processes that allow for either the external threaded part or the internal threaded part to be replaced by a component that has been manufactured to like dimensions and within pre-determined limits, such that the assembly characteristics do not detract from the original intent, when such component replacements or changes are made. (Joseph Whitworth—mid. 1800's)

These same systems, that satisfy the need for interchangeability of component parts, are still used toe ay for structural and safety critical jointed assemblies.

While variations in size and shape have been introduced since the initial standardization concept was developed and documented, the basic understandings as they relate to matching/mating, external and internal fastener systems have remained.

It is important to note that the external and internal fastener systems that are in common use today are based upon a thread profile geometry that is substantially equal to a triangle, where the flanks of the adjacent threads are straight sided and at a pre-determined angle to the axis of the thread. The included angle of the thread having differences in magnitude, dependent upon the chosen reason for making angular changes.

The external and internal fastener systems in common use further develop proportions above and below an imaginary line which is termed the pitch line or, for circular cross section threaded parts, the simple effective diameter.

This imaginary line is at a radial position from the thread axis at which the fatness of the material in the thread equates to the air space distance between adjacent threads.

From such constructions there has been developed understandings that have been based upon empirical studies and the use of vector diagrams to show and estimate the strength of the mating external and internal threads under the effects of induced axially applied forces.

In almost all instances, the developments and the distribution of the induced loads and the resultant mating thread strengths are based upon threads of substantially triangular section, and a pre-determined included thread angle.

It should also be noted, however, that thread profile designs departing from the substantially triangular form, although rare, have been developed to accomplish certain objectives. For example, my earlier U.S. Pat. No. 5,061,135 discloses and claims a fastener which includes a thread profile geometry having a trailing flank angled with respect to the diameter of the fastener and a leading flank with a concave, radiused profile. A primary objective of this thread-forming fastener is to develop forces that will promote material flow in a nut member, such as a pliable plastic or light alloy, so as to increase the amount of nut material in contact with the angled trailing flank of the thread form. As this fastener is driven into the nut material, the force couples and moments generated between the angled trailing flank and the radiused leading flank on an adjacent thread form cause the desired material flow in the nut material. It should be noted that the flow of the nut material, in the prescribed manner, would not be achieved if the thread profile geometry was to be of a symmetrical form when related to a line that is perpendicular to the axis of the externally threaded fastener.

OBJECTIVE AND SUMMARY OF THE INVENTION

Accordingly, it is the general object of this invention to provide a threaded fastening system comprising mating external and internal threads and having a novel thread profile geometry that will enhance the strength of the mating threads, under an axially applied tensile or compression three, above that of mating threads that have known profile forms, such as those that are substantially triangular.

In summary, the invention comprises a fastener system including an externally threaded member having a thread with a substantially non-triangular profile formed thereon and an internally threaded member having a thread with a substantially non-triangular thread formed therein for mating with the substantially non-triangular thread of the externally threaded member along a mating thread contact face, wherein, in assembled form, there is developed an axial load in the externally threaded member, which load is resisted along the mating thread contact face, and wherein the mating threads of the fastener system are capable of withstanding an axial load, tensile or compressive, of greater magnitude than mating threads of a system employing threads having a substantially triangular profile.

BRIEF DESCRIPTION OF THE DRAWINGS

The features of the present invention which are believed to be novel are set forth with particularity in the appended claims.

The organization and manner of operation of the invention together with further objects and advantages thereof may best be understood by reference to the following description taken in connection with the accompanying drawings in which like reference numerals identify like elements and in which.

DETAILED DESCRIPTION OF THE PREFERRED EMBODIMENT

Figure 1:
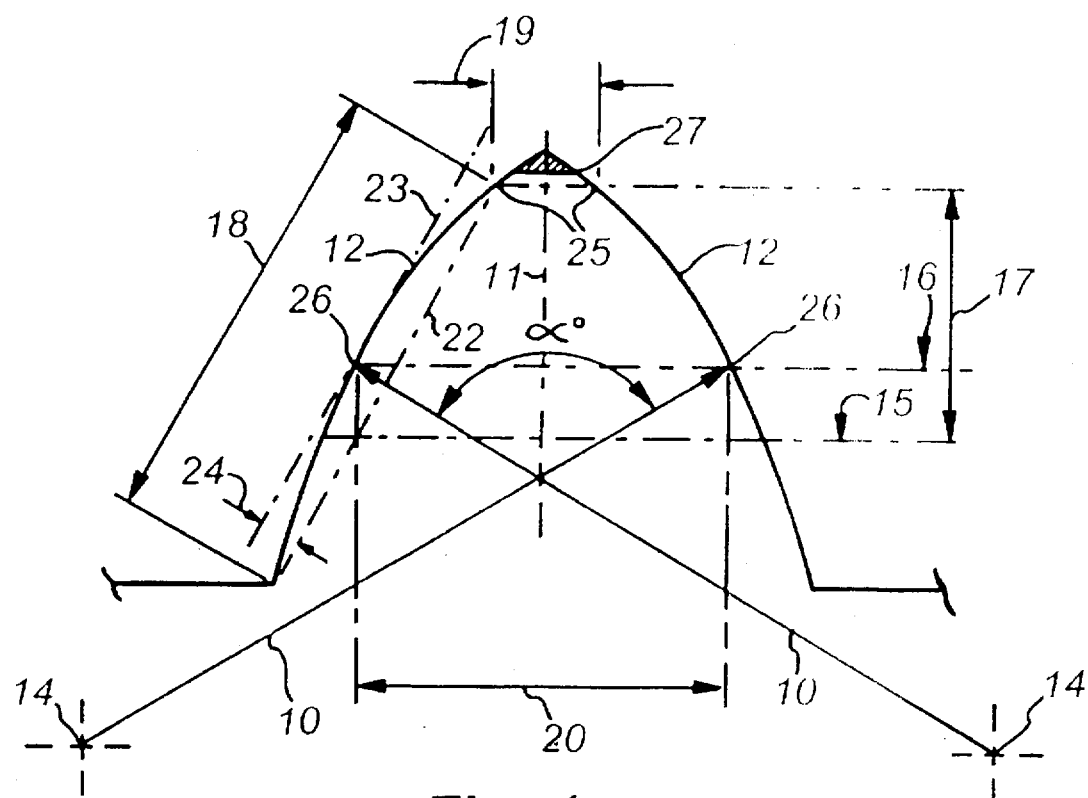
FIG. 1 is a schematic of the basic and design profile for the internal thread embodying the present invention.

While the invention may be susceptible to embodiment in different forms, there are shown in the drawings and herein will be described in detail, specific embodiments with the understanding that the present disclosure is to be considered an exemplification of the principles of the invention and that it is not intended to limit the invention to that as is illustrated and described herein.

Referring to FIG. 1, there is shown the basic and design profile of an internal screw thread 12I that is constructed according to the teachings of the invention.

The profile of the internal thread 12I is developed from radii 10 that are struck from centers 14 such that the profile 12I is symmetrical about the imaginary center line 11.

The magnitude of the radii 10 and the positioning of the centers 14 are developed with reference to the relationship between known, current, maximum metal conditions of an external screw thread and the minimum metal conditions of an internal screw thread. For the purpose of understanding, the relationship is related to a metric thread system where 15 represents the simple effective diameter of an external screw thread at the position that equates to the maximum value associated with the 6 g position and tolerance, as defined in I.S.O. 965/1. Height 17 denotes the theoretical tip height of an external screw thread as it is positioned above the theoretical maximum simple effective diameter 15, as denoted. The theoretical tip width of the metric screw thread is as denoted by 19. Outline 22 being the profile of the external thread that is developed accordingly.

The theoretical relationship between this external thread profile 22 and the mating internal thread profile in accordance with the metric screw thread system and having a position and tolerance in accordance with 6 H, as defined in I.S.O. 965/1, is denoted by the outline 23. The form of this outline 23 being based upon a simple effective diameter 16 that has a magnitude in accordance with that which lies between 6 H mean and 6 H maximum, as defined in I.S.O. 965/1. The system creates a theoretical space 24 between the angled profiles of the external thread 22 and the internal thread 23.

When measured at the simple effective diameter 16 of the internal thread 23 or the simple effective diameter 15 of the external thread 22, the fatness of the internal thread profile and the external thread profile, denoted by 20, is constant and equates to half the magnitude of the thread axial pitch.

From this relationship there is developed datum positions 25, relative to the external thread 22, and 26, relative to the internal thread 23.

Radii 10 are developed to pass through the datums 25 and 26 such that each angled profile face 22 forms a chord length 18 at a height from the periphery equating to 24. The radii 10 being considered as a minimum value related to the present invention. The major thread diameter (internal) can be truncated as shown at 27 provided that such truncations do not fall below or inside of the height 17. Centers 14 are positioned relative to the radii 10 and the datum points 25 and 26 together with the described angle which in the case of the metric screw thread system of past known proportions, equates to 120°.

As noted above, the internal thread profile in accordance with the present invention is contained within the outline 12I.

By maintaining the internal thread proportions as thus described, it allows for the internal thread to utilize measuring devices of existing styles and types.

Figure 2:
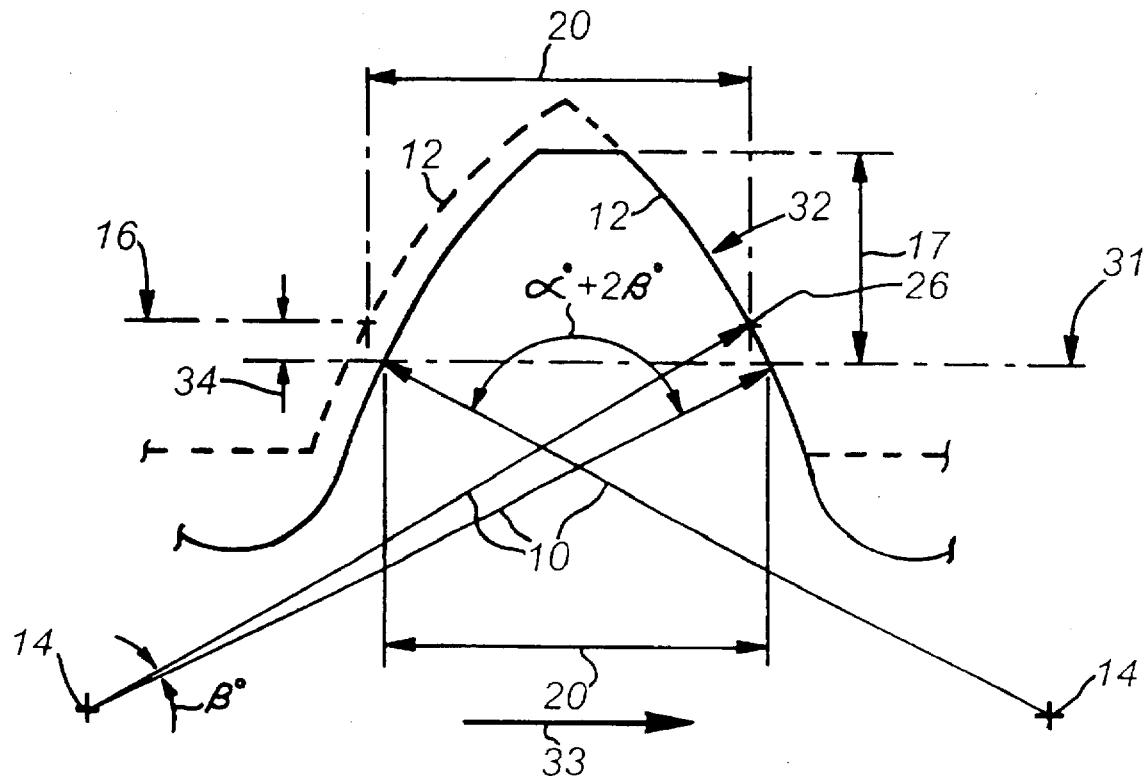
FIG. 2 is a schematic of the basic and design profile for the external thread embodying the present invention.

Referring to FIG. 2 there is shown the basic and design profile of the external screw thread 12E that is constructed according to the teachings of the invention.

There is also shown, on FIG. 2, the basic profile of the internal thread 12I such that it can be envisaged the preferred condition where the contact face 32, between the internal 12I and external 12E thread profiles provide for the highest proportion of the radii 10 to be in contact when there is applied an axially induced load 33 through the member containing the external thread.

The imaginary datum line 31 which depicts the position of the simple effective diameter of the external thread profile 12E that is according to the present invention, is theoretically displaced by the amount denoted 34 inside the theoretical simple effective diameter 16 of the internal thread 23. The value of the height 34 being substantially equal to half the distance between the simple effective diameter 16 of the internal thread and the simple effective diameter 15 of the external thread 22 as shown on FIG. 1.

The radii 10 as related to the external thread 12E being substantially equal to those of the internal thread 12I. The center point 14 of the radius being in the same relative position for both external and internal threads.

However, the displacement 34 between the simple effective diameter 16 and the simple effective diameter 31 requires that the angle α be increased (as indicated by β) to radius 10 and displacement 34 in order to maintain the highest proportion of the radii 10 to be in contact at the contact face 32.

This necessary difference in the proportions of the external thread relative to the internal thread provides for the conditions of thread contact along the pressure face 32 to be maintained within acceptable limits that are within those that occur with mating thread profile of the current known proportions. This provides for distinct advantages where the external thread of the fastener is produced independently of the internal thread and where both the external and internal threads and components provide a fastener system.

Figure 3:
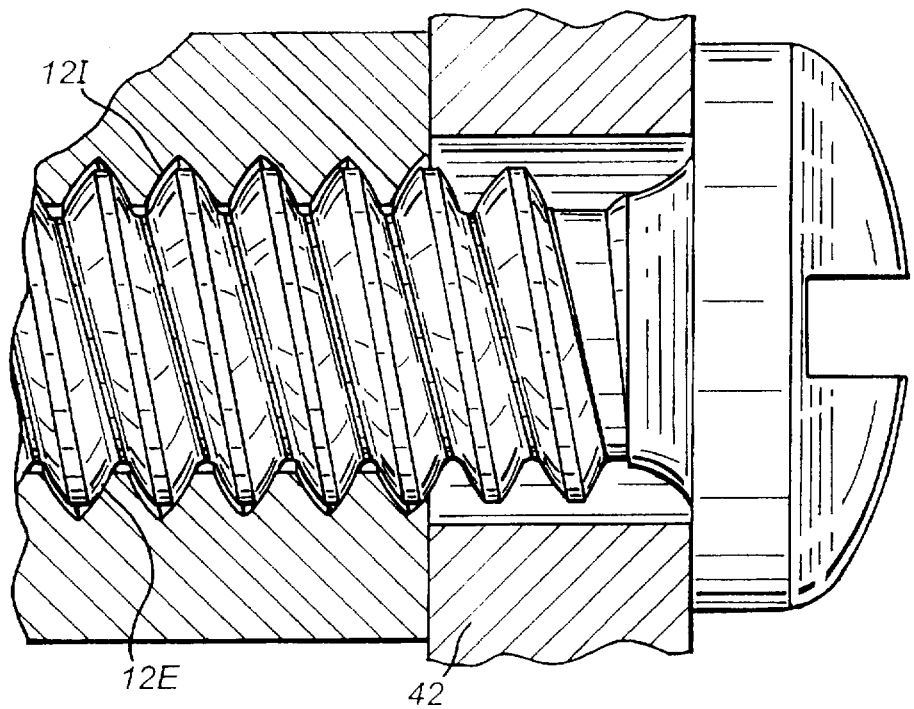
FIG. 3 is a schematic of a completed assembly incorporating the fastener system of the present invention.
Figure 3A:
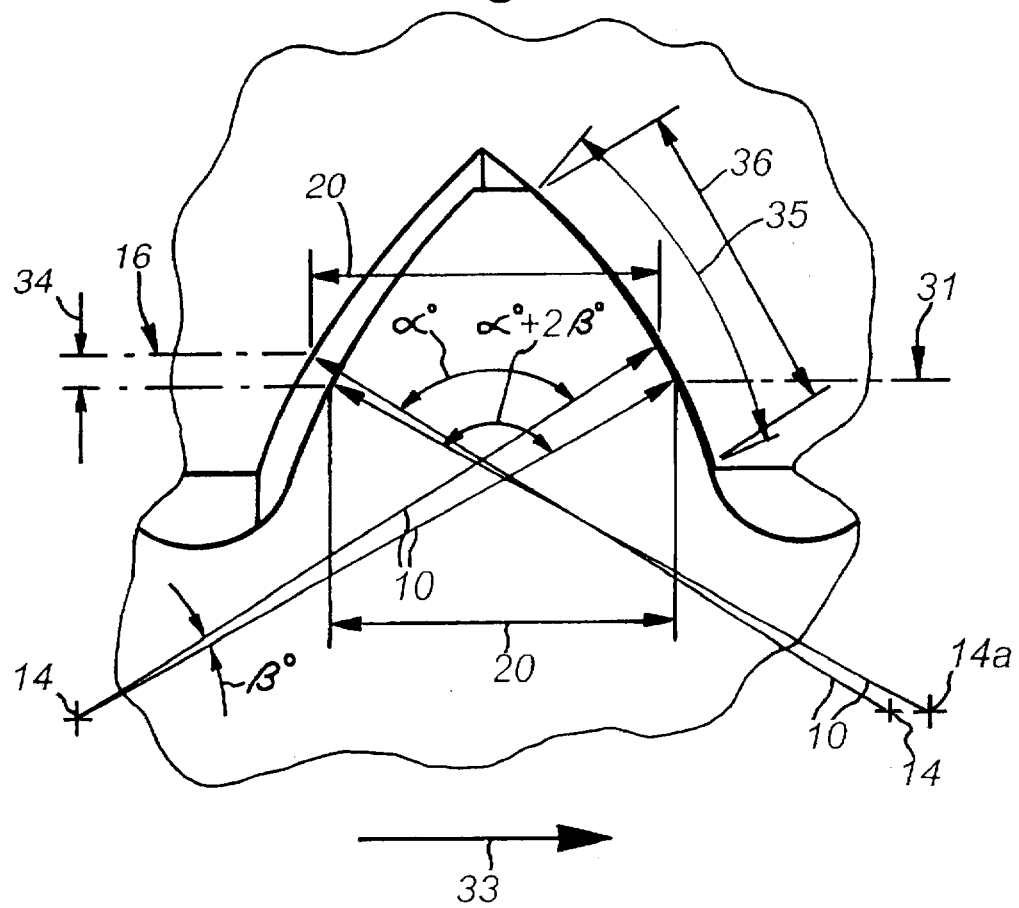
FIG. 3A is a schematic showing the mating external and internal thread conditions embodying the present invention.

FIG. 3 illustrates a fastener system employing the present invention wherein a work piece 42 is held in compression. Referring to FIG. 3A there is shown an enlarged schematic of the mating thread condition present in FIG. 3. Under the effect of the axial force 33 there is developed a resistance to this force along the mating thread contact face 32.

One of the benefits that ensures from having the contact face 32 to be of a radiused profile form is that of increasing the contact area, denoted by 35, over that which would occur from a mating thread profile that is substantially triangular, denoted by 36.

This increase in surface area reduces the pressure, in force per unit area, that needs to be effectively restrained by way of offering resistance to the axial force 33.

The radii profile of the mating threads under pressure will be more effective in preventing thread stripping failure than will a profile that is substantially triangular.

The construction of the external thread profile is seen to maintain the radii 10 as equal in magnitude.

However, from the novel method of construction, it will be seen that the center of the radius that develops an opposite face of the profile, moves from 14 to 14a.

Figure 4:
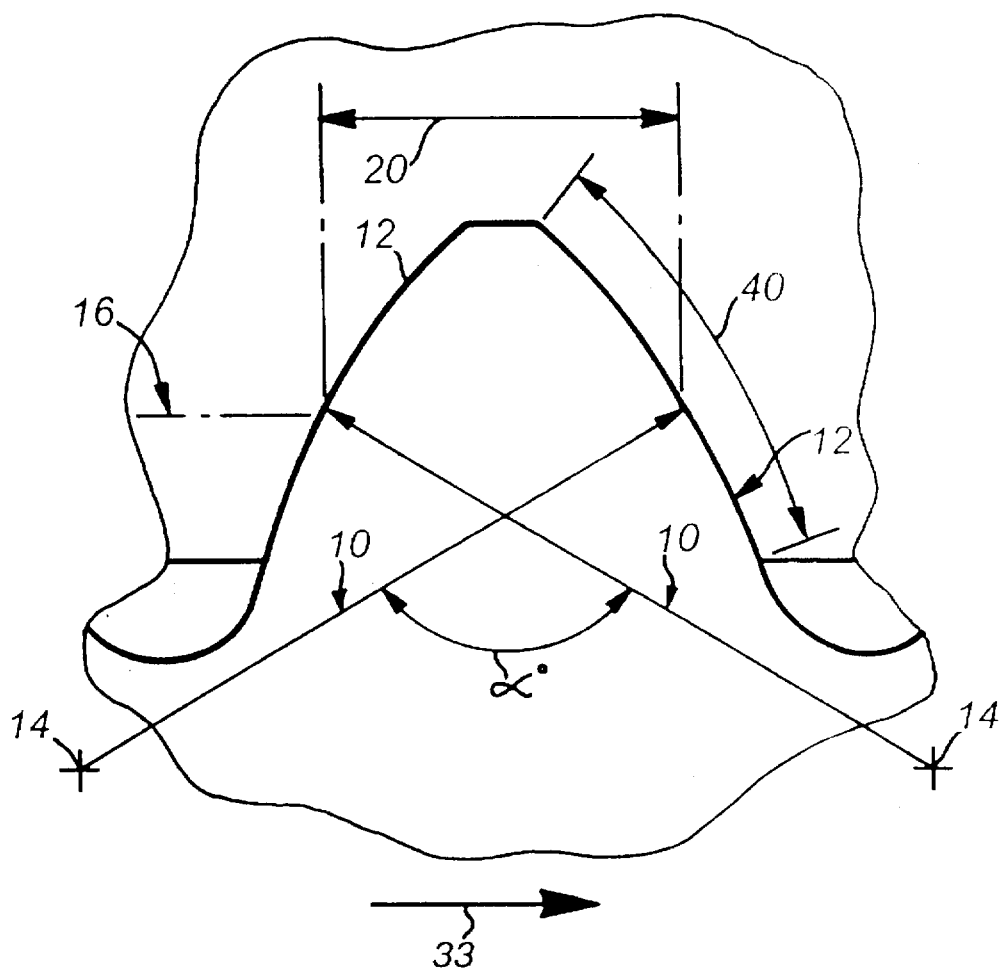
FIG. 4 is a schematic showing the mating external and internal thread conditions where the internal thread is formed by a self-tapping external threaded fastener.

Referring to FIG. 4 there is shown a mating internal and external thread where the internal thread is produced by self-tapping principles and the basic proportions follow the dimensions of the externally threaded member.

In essence, the proportions of the external thread is made in accordance with the dimensions that are to conform with those of the internal thread that would be in accordance with the teachings of the invention.

Under these conditions the engagement length of the radii that are in contact 40 is increased over that denoted by 35 in FIG. 3 and thus further reduces the pressure that needs to be restrained within the mating thread structure.

Figure 5:
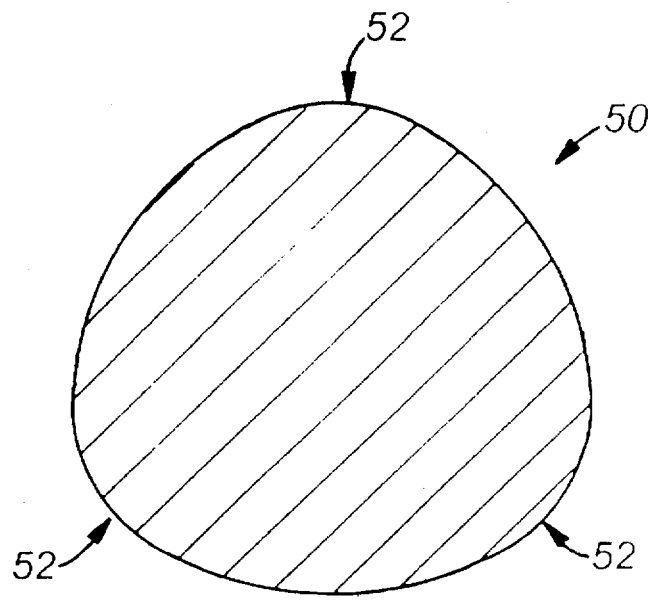
FIG. 5 is a schematic plan view showing an external threaded fastener having a lobular cross section for forming an internal thread according to an embodiment of this invention.

The construction of the external threaded fastener having the thread profile according to the teachings of the invention may have a lobular cross section or any other device that is seen to be applicable for efficient forming of the internal thread during the assembly of the externally threaded screw or bolt. The outline of typical lobular cross section fastener 50 having lobes 52 as shown in top view in FIG. 5. Reference can be made to U.S. Pat. No. 3,195,156 to Phipard, Jr. for the teaching of such thread-forming fastener.

The usefulness of the teachings according to the invention is to relate the respective forms of internal and external proportions to elements that are defined in common terminology as a nut and bolt respectively.

Any and all assembly processes that utilize the concepts will benefit from the ability of the inventive fastener system to withstand higher axial applied forces than those of a more conventional system that is constructed with a thread profile that is substantially of triangular form, all other factors being equal.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design and others being apparent only after study.

As such the scope of the invention should not be limited by the particular embodiment and specific construction defined herein but should be defined by the appended claims and equivalents thereof. Accordingly, the aim in the appended claims is to cover all such changes and modifications as fall within the true spirit and scope of the invention.

The invention is claimed as follows:

1. A threaded fastener system having an axis of rotation and being defined in cross section, through the axis of rotation, by a mating concave curved profile internal thread and a convex curved profile external thread, the curved profile internal thread and curved profile external thread each being defined by a set of curved profile thread size parameters including an effective diameter and an axial thread pitch, and being respectively compatible with and matable with a straight profile external thread and straight profile internal thread of a conventional straight substantially triangular profile threaded fastener system having a mating straight profile internal thread and straight profile external thread, the straight substantially triangular profile threaded fastener system being defined by a set of straight profile thread size parameters according to published standards including a standardized effective diameter, a standardized axial thread pitch, a standardized minimum metal condition and a standardized maximum metal condition, the system comprising:

an internal thread defined by the curved thread size parameters and including a pair of confronting concave thread faces extending between an internal thread tip at a radially innermost location and an internal thread well at a radially outermost location relative to the axis of rotation of the system, each concave thread face being defined by a predetermined concave radius, the predetermined concave radius lying between (1) a first line defined by a face of the straight profile external thread having the compatible straight profile thread size parameters wherein the straight profile external thread is at the standardized maximum metal condition and (2) a second line defined by a face of the straight profile internal thread having the compatible straight profile thread size parameters wherein the straight profile internal thread is at the standardized minimum metal condition;

wherein one of the pair of concave thread faces comprises a concave load-carrying face and another of the pair of concave faces comprises an concave unloaded face;

wherein the internal thread tip is truncated to ensure an interference-free mating with an interengaging external thread;

an external thread defined by the curved thread size parameters and including a pair of confronting convex thread faces extending between an external thread tip at a radially outermost location and an external thread well at a radially innermost location relative to the axis of rotation of the system, each convex thread face being defined by a predetermined convex radius:

wherein one of the pair of convex thread faces comprises a convex load-carrying face and another of the pair of convex thread faces comprises an convex unloaded face;

wherein each concave internal thread face and each convex external thread face includes a center of curvature that defines the respective predetermined concave radius and the predetermined convex radius, the convex load-carrying face being located at the same position as, and having the same radius as, the concave load-carrying face, and the convex unloaded face having the same radius as the convex load-carrying face, and wherein the center of curvature of the convex unloaded face is displaced in an axial direction relative to the center of curvature of the unloaded concave face to accommodate a difference between the effective diameter of the internal thread and the effective diameter of the external thread;

wherein a thread width in an axial direction of the external thread at a radial location of the effective diameter of the external thread is equal to one half the thread axial pitch, whereby both axially applied compression forces and axially applied tension forces can be applied to mating of the internal and external threads.

2. A threaded fastener system in accordance with claim 1, wherein the external thread defines a self-tapping thread profile constructed and arranged to form an internal thread in an unthreaded hole of predetermined diameter in response to rotation of the external thread about the axis of rotation relative to the unthreaded hole.

3. A threaded fastener system in accordance with claims 1 or 2 wherein a surface contact area of the internal thread and the external thread are greater than a surface contact area of the straight profile internal thread and straight profile external thread, respectively, whereby a stress induced in each of the internal thread and the external thread is decreased for a predetermined axial load.

4. A self-tapping threaded fastener system having an axis of rotation and being defined in cross section, through the axis of rotation, by a mating concave curved profile internal thread and a convex curved profile external thread, the curved profile internal thread and curved profile external thread each being defined by a set of curved profile thread size parameters including an effective diameter and an axial thread pitch, and being respectively compatible with and matable with a straight profile external thread and straight profile internal thread of a conventional straight substantially triangular profile threaded fastener system having a mating straight profile internal thread and straight profile external thread, the straight substantially triangular profile threaded fastener system being defined by a set of straight profile thread size parameters according to published standards including a standardized effective diameter, a standardized axial thread pitch, standardized minimum metal condition and a standardized maximum metal condition, the system comprising:

an external thread defined by the curved thread size parameters and including a pair of confronting convex thread faces extending between an external thread tip at a radially outermost location and an external thread well at a radially innermost location relative to the axis of rotation of the system, each convex thread face being defined by a predetermined convex radius, the predetermined convex radius lying between (1) a first line defined by a face of the straight profile external thread having the compatible straight profile thread size parameters wherein the straight profile external thread is at the standardized maximum metal condition and (2) a second line defined by a face of the straight profile internal thread having the compatible straight profile thread size parameters wherein the straight profile internal thread is at the standardized minimum metal condition;

wherein one of the pair of convex thread faces comprises a convex load-carrying face and another of the pair of convex faces comprises an convex unloaded face;

a conforming internal thread including a pair of confronting concave thread faces extending between an internal thread tip at a radially outermost location and an internal thread well at a radially innermost location relative to the axis of rotation of the system, each concave thread face being defined by a predetermined concave radius, the concave thread faces each contacting an adjacent one of the convex faces at at-least some locations therebetween;

wherein one of the pair of concave thread faces comprises a concave load-carrying face and another of the pair of concave thread faces comprises an concave unloaded face; and wherein the external thread defines a self-tapping thread profile constructed and arranged to form the internal thread in an unthreaded hole of predetermined diameter in response to rotation of the external thread about the axis of rotation relative to the unthreaded hole.

5. The fastener system of claim 4, wherein a normal to a tangent of the convex thread face, where such tangent is at a radial position of a simple effective diameter of the external thread subtends an included angle that is greater than an included angle subtended by a normal to a tangent of the concave thread face, at a related simple effective diameter of the internal thread, whereby a maximum area of contact between mating of the convex thread faces and concave thread faces is attained.

6. The fastener system of claim 5, wherein each of the pair of convex thread faces is symmetrical to the other, whereby the system can equally, effectively withstand both tensile and compressive axial loads.

7. The fastener system of claim 4, wherein the self-tapping thread profile defines a circular outer perimeter shape.

8. The fastener system of claim 4, wherein the self tapping thread profile defines a non-circular, lobular outer perimeter shape.

9. The fastener system of claim 4, wherein the external thread tip is truncated whereby the tip is located radially inwardly a predetermined distance from an imaginary intersection point between each of the pair of convex faces.

10. The fastener system of claim 4 wherein a thread width in an axial direction of the external thread at a radial location of the effective diameter of the external thread is equal to one half the thread axial pitch, whereby both axially applied compression forces and axially applied tension forces can be applied to mating of the internal and external threads.

* * * * *